(12) United States Patent
Todo et al.

(10) Patent No.: US 8,124,258 B2
(45) Date of Patent: Feb. 28, 2012

(54) GLASS SUBSTRATE FOR MAGNETIC DISK (75) Inventors: Shinpei Todo, Tokyo (JP); Yasuhiro Naka, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/474,765

(22) Filed: May 29, 2009

(65) Prior Publication Data
US 2009/0324995 A1 Dec. 31, 2009

(30) Foreign Application Priority Data

May 30, 2008 (JP) ................. 2008-143486

(51) Int. Cl.
*G11B 5/70* (2006.01)
*B24B 1/00* (2006.01)
*C09K 3/14* (2006.01)

(52) U.S. Cl. ............... 428/848.2; 428/848.3; 428/848.8; 65/111; 360/135

(58) Field of Classification Search ............... 428/846.1, 428/846.6, 848.5, 65.3, 64.2, 141, 848.3, 428/800, 848.1, 848, 900, 848.2, 848.8; 216/91; 65/111, 134.3, 134.1; 501/55, 56, 69, 70; 360/135
See application file for complete search history.

(56) References Cited

U.S. PATENT DOCUMENTS

| | | | | |
|---|---|---|---|---|
| 6,096,445 A | * | 8/2000 | Terakado et al. | 428/848.3 |
| 2003/0113506 A1 | * | 6/2003 | Takahashi et al. | 428/65.3 |
| 2003/0113512 A1 | * | 6/2003 | Watanabe et al. | 428/141 |
| 2003/0121288 A1 | * | 7/2003 | Naka et al. | 65/134.3 |
| 2003/0194583 A1 | * | 10/2003 | Miyamoto | 428/65.3 |
| 2005/0008822 A1 | * | 1/2005 | Miyamoto et al. | 428/141 |
| 2006/0000809 A1 | * | 1/2006 | Matsumoto | 216/91 |
| 2006/0194080 A1 | * | 8/2006 | Ishii et al. | 428/64.2 |
| 2007/0003799 A1 | * | 1/2007 | Ogiwara et al. | 428/848.1 |
| 2008/0020238 A1 | * | 1/2008 | Tanaka et al. | 428/810 |
| 2009/0297772 A1 | * | 12/2009 | Tanii | 428/141 |

FOREIGN PATENT DOCUMENTS

| | | |
|---|---|---|
| JP | 6-198530 | 7/1994 |
| JP | 10-241144 | 9/1998 |
| JP | 2000-348330 | 12/2000 |
| WO | WO 2008/068962 | * 12/2008 |

OTHER PUBLICATIONS

Machine translation JP 2000-348330 (Dec. 2000).*

* cited by examiner

*Primary Examiner* — Kevin M. Bernatz
*Assistant Examiner* — Louis Falasco
(74) *Attorney, Agent, or Firm* — Oblon, Spivak, McClelland, Maier & Neustadt, L.L.P.

(57) ABSTRACT

There is provided a glass substrate for a magnetic disk in which a maximum height of bumps forming a roughness pattern at a period of smaller than 2 μm is 6 nm or lower in an annular area having a width of 30 μm on a main surface on which a magnetic recording area is formed, a number of bumps having a height of 3 nm or higher in a unit area having a circular arc length of 30 μm within the annular area is one or less, and a difference in arithmetic average roughness between unit areas within the annular area is 0.2 nm or smaller.

5 Claims, 7 Drawing Sheets

FIG.9 Comparative Example 1
Background Art

FIG.10 Comparative Example 2
Background Art

FIG.11  Comparative Example 3
Background Art

FIG.12

| | NUMBER | MAXIMUM HEIGHT OF BUMPS (nm) | AREA HAVING CIRCULAR ARC LENGTH 30 μm | | | DIFFERENCE IN AVERAGE ROUGHNESS (nm) | MAGNETIC DISK CHECK |
|---|---|---|---|---|---|---|---|
| | | | 0° POSITION | | 180° POSITION | | |
| | | | NUMBER OF BUMPS HAVING 3 nm OR HIGHER | AVERAGE ROUGHNESS (nm) | AVERAGE ROUGHNESS (nm) | | |
| EXAMPLE | 1 | 6 | 1 | 0.5 | 0.3 | 0.2 | NORMAL |
| | 2 | 4 | 1 | 0.3 | 0.3 | 0.0 | NORMAL |
| COMPARATIVE EXAMPLE | 1 | 7 | 1 | 0.4 | 0.5 | 0.1 | ERROR |
| | 2 | 4 | 4 | 0.4 | 0.3 | 0.1 | ERROR |
| | 3 | 3 | 1 | 0.2 | 0.5 | 0.3 | ERROR |

GLASS SUBSTRATE FOR MAGNETIC DISK

CROSS-REFERENCE TO RELATED APPLICATIONS

The present document incorporates by reference the entire contents of Japanese priority document, 2008-143486 filed in Japan on May 30, 2008.

BACKGROUND OF THE INVENTION

1. Field of the Invention

The present invention relates to a glass substrate for a magnetic disk that is used in a magnetic disk drive, such as a hard disk drive.

2. Description of the Related Art

A torus-shape glass substrate having a circular hole at the center of a circular plate has been used as a glass substrate for a magnetic disk that is used in a magnetic disk drive, such as a hard disk drive (see Japanese Patent Application Laid-open No. H6-198530). This glass substrate is produced in the following manner, for example. Firstly, thin glass plates are cored and shaped into a plurality of torus-shape glass substrates. Then, these glass substrates are polished at the same time by a batch-type double-sided polishing machine so that values defining patterns of their main surfaces is set, for example, sufficient for high-density recording (see Japanese Patent Application Laid-open No. H10-241144 and Japanese Patent Application Laid-open No. 2000-348330). For example, in Japanese Patent Application Laid-open No. H10-241144, the pattern of the main surface of the glass substrate is defined by surface roughness, more particularly, it is defined that a maximum height Rmax≦15 nm, an arithmetic-average roughness Ra≦1 nm, and a root-mean-square roughness Rq≦1.5 nm. In contrast, in Japanese Patent Application Laid-open No. 2000-348330, the pattern of the main surface is defined by average height of waviness, more particularly, it is defined that an average height of micro-waviness at periods from 2 µm to 4 mm is equal to or lower than 1.27 nm, and an average height of waviness at periods from 300 µm to 5 mm is equal to or lower than 1.0 nm.

To meet requests for higher-capacity hard disk drives in recent years, various technologies have been developed. There are developed, for example, downsizing of a magnetic head or a magnetic head element, narrowing of tracks and sectors of the magnetic disk, thinning of various layers that are formed on the main surface of the magnetic disk, such as a protection/lubrication layer, a magnetic layer, and a soft magnetic layer, decreasing of a distance between the disk and the head, i.e., flying height, and increasing of a rotation speed of the magnetic disk.

However, when a glass substrate for a magnetic disk is produced by using the glass substrate having the pattern of the main surface satisfying the conventional definitions and a magnetic disk drive is produced by using the glass substrate, the flying height is reduced to about 8 nm and the rotation speed of the magnetic disk is set a speed as high as 10000 rpm or higher, an error such as a read error or a write error may occur in operation of the magnetic disk drive.

SUMMARY OF THE INVENTION

It is an object of the present invention to at least partially solve the problems in the conventional technology.

According to one aspect of the present invention, there is provided a glass substrate for a magnetic disk in which a maximum height of bumps forming a roughness pattern at a period of smaller than 2 µm is 6 nm or lower in an annular area having a width of 30 µm on a main surface on which a magnetic recording area is formed, a number of bumps having a height of 3 nm or higher in a unit area having a circular arc length of 30 µm within the annular area is one or less, and a difference in arithmetic average roughness between unit areas within the annular area is 0.2 nm or smaller.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a glass substrate for a magnetic disk according to the present invention are described in detail below with reference to FIG. 1 to FIG. 4. The present invention is not limited to these embodiments, and various modifications can be made without departing from the scope of the present invention. The surface roughness hereinafter is followed by the definition of B0601:2001 of Japanese Industrial Standards (JIS).

Embodiment

Figure 1:
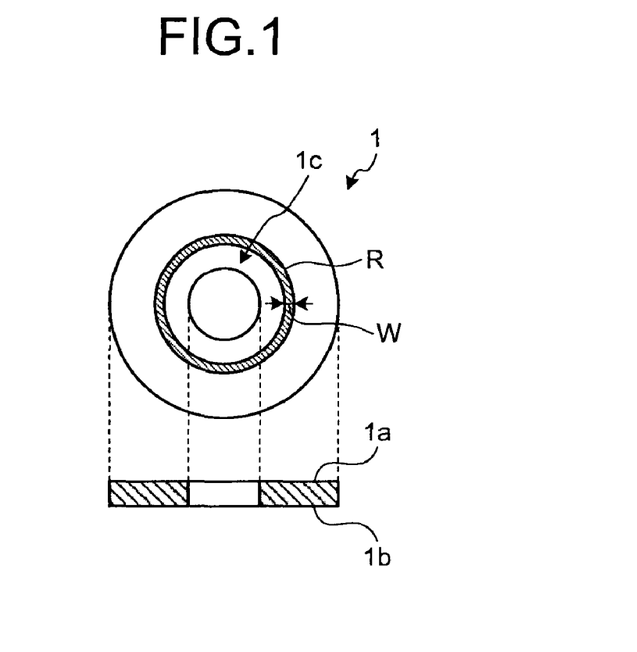
FIG. 1 is a diagram including a top view and a cross-sectional view of a glass substrate according to an embodiment of the present invention.

FIG. 1 is a diagram including a top view and a cross-sectional view of a glass substrate according to an embodiment of the present invention. As shown in FIG. 1, a glass substrate 1 according to the embodiment has main surfaces 1a, 1b on which magnetic recording areas are formed. The glass substrate 1 is torus in shape, having a circular hole 1c at the center area. The glass substrate 1 is formed to satisfy predetermined product specifications in size. For example, the outer diameter is 2.5 inches (65 mm), the inner diameter is about 20 mm, and the thickness is 635 μm±10 μm.

As shown in FIG. 1, it is defined on the main surface 1a of the glass substrate 1 an annular area R having a width W 30 μm that is positioned concentrically with the circular hole 1c within a zone of the magnetic recording area ranging 16 mm to 28 mm in the inner diameter. The maximum height of the glass substrate 1 is set 6 nm or lower with reference to an average height of bumps forming a bumpy pattern at a period of smaller than 2 μm period of the annular area R. If it is assumed that areas forming the annular area R each having the circular arc length 30 μm are measurement-unit areas, one or less bump having the height 3 nm or higher, which is decided with reference to the average height of the annular area R, is present in each measurement-unit area.

Figure 2:
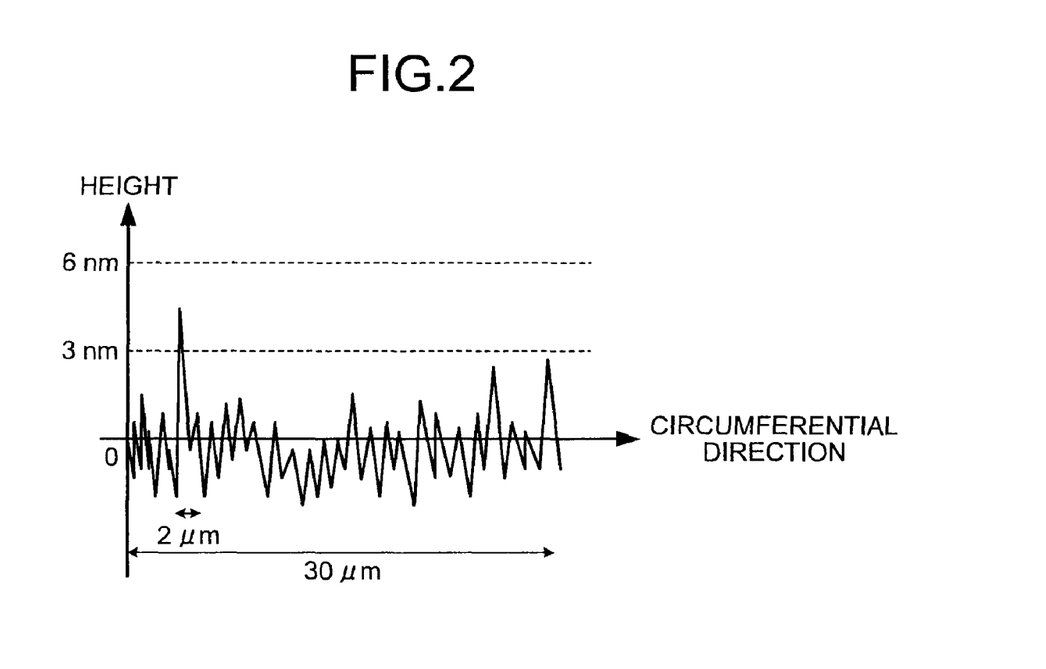
FIG. 2 is a diagram for conceptually explaining, in an annular area of the glass substrate shown in FIG. 1, a relation between position in the circumferential direction with reference to an arbitrary position and height of a bumpy pattern of a main surface at that position.

FIG. 2 is a diagram for conceptually explaining, in the annular area R of the glass substrate 1, a relation between position in the circumferential direction with reference to an arbitrary position and height of the bumpy pattern of the main surface 1a at that position. The height in FIG. 2 is a value measured in the assumption that the average height of the annular area R on the main surface 1a is zero. As shown in FIG. 2, in an area ranging 30 μm from the reference position in the circumferential direction, i.e., an area having the circular arch length 30 μm, all the bumps are 6 nm or lower and the number of bumps having the height 3 nm or higher is one.

Moreover, in the glass substrate 1, a difference between the measurement-unit areas of the annular area R in arithmetic average roughness (hereinafter, referred to as "average roughness") is 0.2 nm or less. In the glass substrate 1, the maximum height of the bumps forming the bumpy pattern at a period of smaller than 2 μm in the annular area R is 6 nm or lower, one or less bump having the height 3 nm or higher is present in each measuring-unit area of the annular area R, and a difference between the measurement-unit areas of the annular area R in the arithmetic average roughness is 0.2 nm or less so that low flying height and an error during the high-speed rotation are less likely to occur in the magnetic disk drive using the glass substrate 1.

According to measurement by the inventors with an atomic force microscope (AFM) about the surface pattern of the glass substrate that is used in the magnetic disk drive in which the low flying height and the error during the high-speed rotation are likely to occur, even if the glass substrate having the surface pattern satisfying the conventional definitions is used, if the maximum height of the bumps forming the bumpy pattern at a period of smaller than 2 μm period in the annular area having the width 30 μm exceeds 6 nm, the low flying height and the error during the high-speed rotation occur. Even if the maximum height of the bumps is 6 nm or lower, if the bumps having the height 3 nm or higher are present sequentially in the circumferential direction, more particularly, if two or more such bumps are present in a measurement-unit area having the circular arc length 30 μm, the error occurs. Even if the difference in the average surface roughness between the measurement-unit areas of the annular area is larger than 0.2 nm, the error occurs. That is, the study by the inventors found that occurrence of the error depends on the maximum height of the bumps in the annular area, the frequency of appearance of the bumps, and the evenness in the surface roughness. The above-described measurement can be implemented with an AFM capable of measuring the bumps with the measurement limit about 0.01 nm and the pattern identification resolution 0.2 μm or less, for example, 60 nm or is sufficient with the resolution and the accuracy of a probe-type microscope.

Through simulated calculation based on an atomic force in the assumption of the distance between the disk and the head, the disk rotation speed, the position of the annular area to be measured away from the center of rotation, the inventors found that a dilatational wave is generated according to a probability density of air molecules that are present between the disk and the head and that the following phenomena 1) to 7) are caused by the dilatational wave.

1) A self-excited vibration is caused at the tip of the flying magnetic head element by rotation of the disk, which increases a noise content at the magnetic writing and the magnetic reading. 2) The charge density fluctuates due to unevenness of the molecule/electron density, which causes an increase of the undesirable noise content in the electromagnetic field that is used in the writing or the reading. 3) Due to the concentration of the molecules, the temperature at the concentrated part increases too high. This may cause lattice defect on the surface of the magnetic head element and the surface of the magnetic disk. 4) From the viewpoint of the effective width of the magnetic head slider, the bumpy pattern of the annular area having the width 30 μm is applicable for management. 5) If two or more bumps are present in an area having the circular arc length 30 μm sequentially at short periods (smaller than 2 μm), the head vibration is likely to occur, which brings unstable flying. In contrast, if the bumpy pattern has longer periods longer, because the head flies along the bumpy pattern, the head can flow stably. 6) A problem related to the head flying occurs when the surface roughness varies in a single circle of the annular area. If the difference within the annular area is larger than 0.2 nm, for example, the average roughness of an area having the circular arc length 30 μm located at a predetermined position on the annular area is 0.5 nm and the average roughness of the area having the circular arc length 30 μm located at a position 180° from the predetermined position is 0.2 nm, the above-described problem related to the head flying occurs. As for the evenness in the surface roughness on the circumference of the circle, from the viewpoint of the manner of the polishing, it is sufficient to set the difference between the average roughness at the predetermined position and the average roughness at the position 180° from the predetermined position to 0.2 nm or less. 7) As the magnetic-disk layers (the protection/lubrication layer, the magnetic layer, and the soft magnetic layer) are formed in thin films on the glass substrate, if the bumps, which are the above-described cyclic components, are present on the glass substrate, even when the layers are formed on the glass substrate, the surfaces of the layers are bumpy in the same manner as in the glass substrate is, i.e., the surface pattern of the magnetic disk directly reflects the cyclic pattern.

Thus, the inventors study hard about conditions to decrease the occurrence of the low flying height and the error during the high-speed rotation based on the phenomena that are found from the above-described measurement and calculation, and eventually achieve the present invention.

Figure 3:
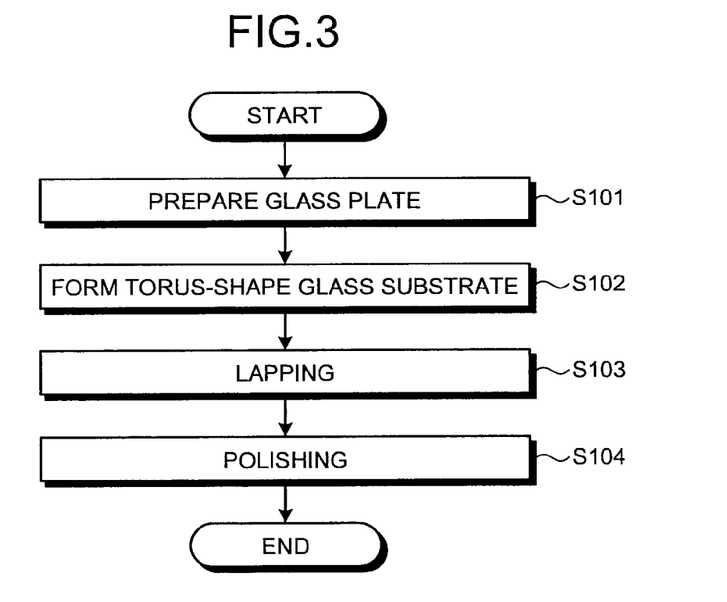
FIG. 3 is a flowchart of an example of a manner of producing the glass substrate shown in FIG. 1.

A manner of producing the glass substrate 1 according to the embodiment is described. FIG. 3 is a flowchart of an example of the manner of producing the glass substrate 1. In the manner of producing the glass substrate, as shown in FIG. 3, a glass plate with a predetermined thickness is prepared, first (Step S101). Then, the prepared glass plate is cored and shaped into a torus-shape glass substrate (Step S102). Then, a lapping step is performed in which the plural shaped glass substrates are pressed between polishing pads both from the upside and the downside and lapped at the same time. After that, a polishing step is performed in which each of the glass substrates polished at Step S103 is further polished at the same time (Step S104). Thus, the glass substrate is produced as the product.

These steps are described in detail below. In the preparation for the glass plate at Step S101, it is used a widely-known method using floating molten glass as a material, such as a float glass method, a downdraw method, and an overflow method. A redraw method of softening by heat the base glass plate that is formed using the float glass method or the like and extending the softened glass to a desired thickness is preferable because a glass plate having an even thickness is formed in a relatively easy manner. The glass plate can be made of glass ceramic such as amorphous glass and crystallized glass. The amorphous glass is preferable from the viewpoint of moldability and workability, for example, aluminosilicate glass, soda lime glass, soda aluminosilicate glass, aluminoborosilicate glass, borosilicate glass, physically tempered glass cooled by air or liquid, and chemically tempered glass are preferable.

Figure 4:
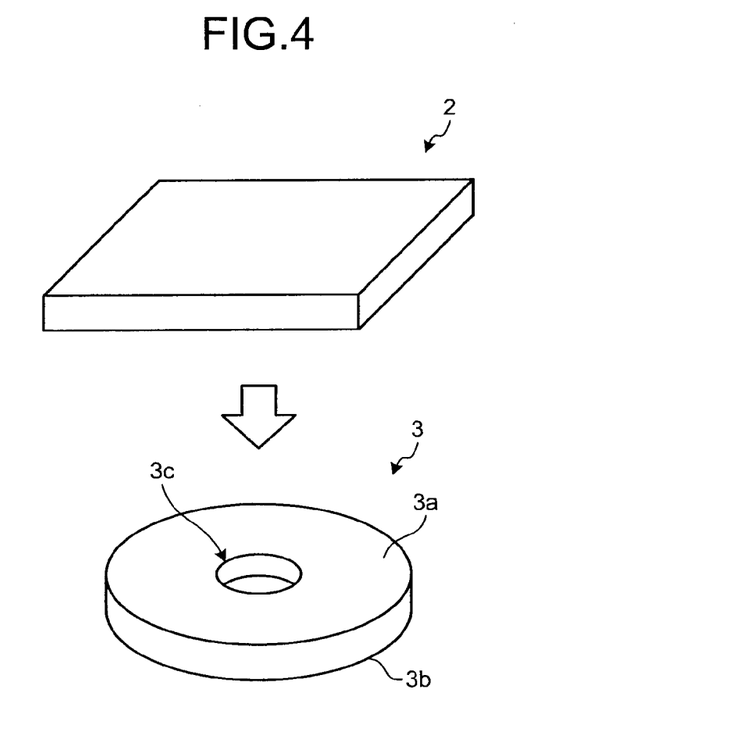
FIG. 4 is a diagram for explaining a step of shaping the glass substrate.

In the shaping into the torus-shape glass substrate at Step S102, as shown in FIG. 4, the glass plate 2 that is prepared at Step S101 is cored and shaped into a glass substrate 3. A well-know method that is disclosed in, for example, Japanese Patent Application Laid-open No. H6-198530 can be used for the coring. The shaped glass substrate 3 is a torus-shape glass substrate having main surfaces 3a, 3b and a circular hole 3c at its center area.

Figure 5:
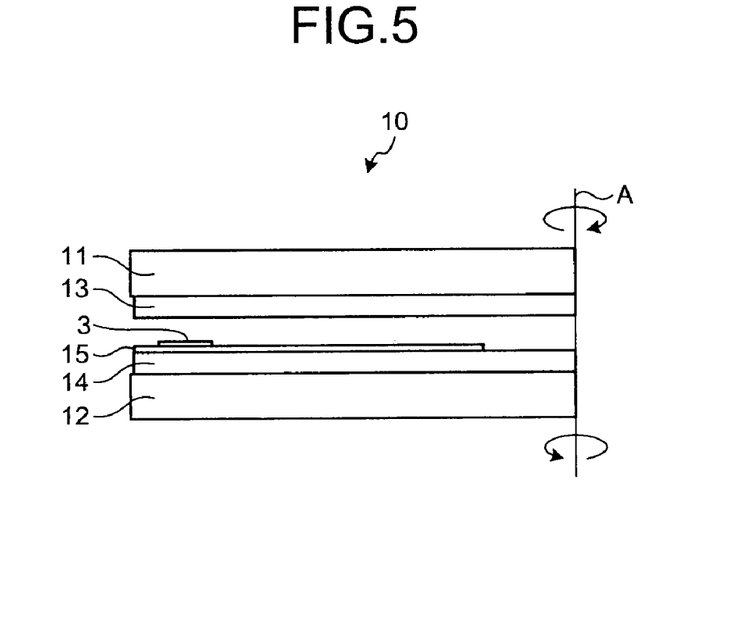
FIG. 5 is a schematic diagram of a part of a side face of a double-sided polishing machine.
Figure 6:
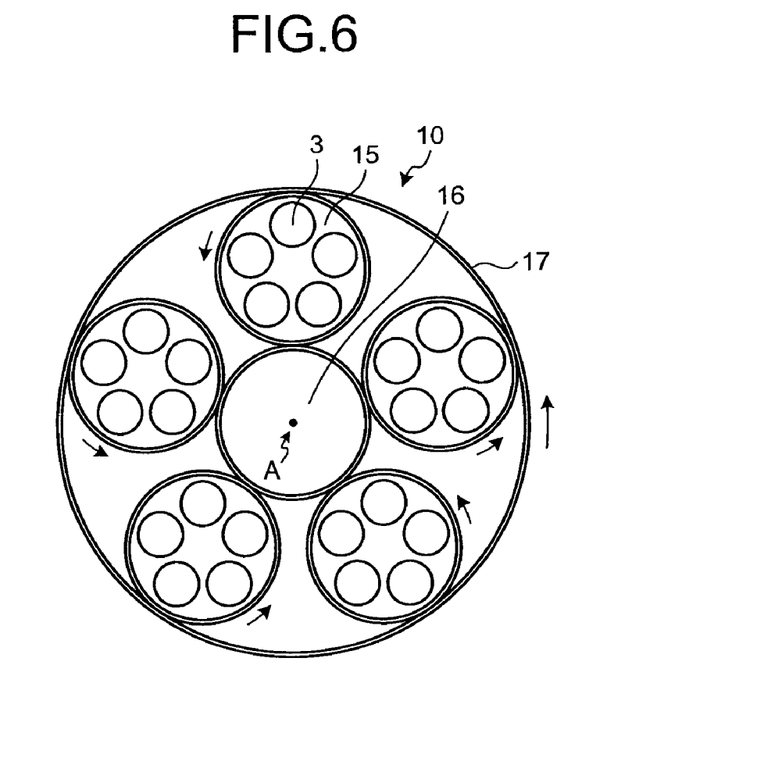
FIG. 6 is a plain view of the double-sided polishing machine with its upper press platen being removed.

In the lapping step at Step S103, it can be used a commercially available batch-type double-sided polishing machine shown in FIGS. 5 and 6. FIG. 5 is a schematic diagram of a part of a side face of the double-sided polishing machine. As shown in FIG. 5, a double-sided polishing machine 10 includes a cast-iron upper press platen 11 and a cast-iron lower press platen 12, a carrier 15 that supports the plural glass substrates 3 between the upper press platen 11 and the lower press platen 12, and polishing pads 13, 14 that are made of rigid polyurethane or the like arranged on a surface of the upper press platen 11 that is in contact with the glass substrate 3 and a surface of the lower press platen 12 that is in contact with the glass substrate 3, respectively. It is noted that when "rigid" is used herein, the material has the hardness (ASKER C) 85 or higher when it is measured in a measurement method that is prescribed in Society of Rubber Industry of Japan standards (SRIS0101).

The double-sided polishing machine 10 supports the plural glass substrates 3 between the upper press platen 11 and the lower press platen 12 by the carrier 15, and presses each of the glass substrates 3 with a predetermined processing pressure by the upper press platen 11 and the lower press platen 12. Each of the glass substrates 3 is then nipped by the polishing pads 13, 14 from both the upside and the downside. After that, the upper press platen 11 and the lower press platen 12 are rotated upon an axis A in directions opposed to each other, while a predetermined amount of a slurry is supplied between the polishing pad 13 and each of the glass substrates 3 and between the polishing pad 14 and each of the glass substrates 3. The glass substrate 3 slides on the surfaces of the polishing pads 13, 14, as a result of which both surfaces are polished at the same time. As for the slurry, a slurry containing abrasive grain made of ceric oxide having the grain diameter 0.1 µm to 1 µm is preferable.

FIG. 6 is a plain view of the double-sided polishing machine 10 with the upper press platen 11 being removed. As shown in FIG. 6, the double-sided polishing machine 10 uses five carriers 15 each capable of supporting five glass substrates 3, i.e., up to 25 glass substrates 3 are set up at the same time. The number of the glass substrates 3 that are to be polished at the same time is an arbitrary number equal to or smaller than 25. If the carriers or the like are changed, it is possible to set up more than 25 glass substrates, e.g., 100 or more glass substrates. A gear that is provided to a circumference of the carrier 15 is engaged with a gear that is provided to a circumference of a core wheel 16 and an internal gear 17. As a result, each of the carriers 15 rotates around the core wheel 16 by the axis A, while rotating by its center axis. Both surfaces of the 25 glass substrates 3 supported by the carriers 15 are polished uniformly at the same time.

In the polishing step at Step S104, the polishing pads 13, 14 of the double-sided polishing machine 10 are replaced with flexible polishing pads for the polishing that are made of, for example, urethane foam. The glass substrates 3 are polished by the above-described polishing pads with a slurry containing abrasive grain made of colloidal silica having the grain diameter 0.01 µm to 0.1 µm. It is noted that when "flexible" is used herein, the material has the hardness from 60 to 80. The main surfaces of the glass substrates 3 are polished into mirror finished surfaces, and thus the glass substrate 1 shown in FIG. 1 is produced.

Examples and Comparative examples of the present invention are described below. The present invention is not limited to these examples.

Examples 1 and 2

In Examples 1 and 2, a glass plate having the width 90 mm and the length 10 m or longer is formed from aluminosilicate glass by using the redraw method. A glass plate having the thickness close to the desired thickness is selected, and the selected glass plate is cored and shaped into a torus-shape glass substrate having the outer diameter 65 mm and the inner diameter of the circular hole 20 mm. After that, the shaped glass substrate is set in the double-sided polishing machine having the configuration as shown in FIGS. 5 and 6. The glass substrate is subjected to the lapping step and the polishing step in the same manner as in the above-described embodiment, and thus the glass substrate is produced. In the lapping step, urethane polishing pads with the hardness 87 (HPC-90D produced by HAMAI Co., Ltd.) and a slurry containing water and abrasive grain made of ceric oxide in a free state are used. As for the ceric-oxide abrasive grain, an abrasive grain having the diameter from 0.1 µm to 0.4 µm and the average diameter 0.19 µm is used in Example 1; and an abrasive grain having the diameter from 0.3 µm to 0.8 µm and the average diameter 0.5 µm is used in Example 2. The other polishing conditions for the lapping step are that the rotation speed of the press platens is 25 rpm, the rate at which the slurry is supplied is 1500 cc/minute, and the processing pressure is 120 g/cm$^2$. The polishing speed is 0.32 µm/min in Example 1, and 0.36 µm/min in Example 2. The polishing speed is calculated by a polished thickness of each surface, which is calculated based on a difference between a weight of the glass substrate before polished and a weight of the glass substrate after polished, and a time for the polishing. In the polishing step, in both Examples 1 and 2, the polishing pads made of urethane foam having the hardness 76 and the abrasive solution containing water and colloidal silica in a free state having the grain diameter from 10 nm to 100 nm and the average grain diameter 80 nm are used. The other polishing conditions for the polishing step are that the polishing time is 8.5 minutes, and the processing pressure is from 50 to 120 g/cm².

Comparative Examples 1 to 3

In Comparative examples 1 to 3, a torus-shape glass substrate that is slightly thicker than those used in Examples 1 and 2 is shaped in the same manner as in Examples 1 and 2. The shaped glass substrate is subjected to a lapping step so that the glass substrate with the desired thickness is formed. After that, the glass substrate is set in the double-sided polishing machine having the configuration as shown in FIGS. 5 and 6. The glass substrate is subjected to first to third polishing steps that are described below, and is produced. The first polishing step and the second polishing step correspond to the lapping step in Examples; the third polishing step corresponds to the polishing step in Examples. In the first polishing step, the urethane polishing pads having the hardness 87 and a slurry containing water and abrasive grain made of ceric oxide in a free state are used. As for the ceric-oxide abrasive grain, the abrasive grain having the average diameter 1 μm is used in all Comparative examples 1 to 3. The other polishing conditions for the first polishing step are that the rotation speed of the press platens is 25 rpm, the rate at which the slurry is supplied is 1500 cc/minute, and the processing pressure is 120 g/cm². The polishing speed is 0.32 μm/min. In the second polishing step, urethane-foam polishing pads having the hardness 76 and a slurry containing water and abrasive grain made of ceric oxide in a free state having the average diameter 1 μm are used in all Comparative examples 1 to 3. In the third polishing step, extremely flexible urethane polishing pads having a hardness of 58 and a slurry containing water and abrasive grain made of ceric oxide in a free state having the average diameter 0.2 nm or smaller are used in all Comparative examples 1 to 3. The other polishing conditions for the second and the third polishing steps are that the polishing time is 8.5 minutes, and the processing pressure is from 50 to 120 g/cm².

The main surface of the glass substrate in each of Examples 1 and 2 and Comparative examples 1 to 3 is measured in such a manner that the annular area having the width 30 μm and the inner radius 28 mm with respect to the center is separated into the measurement-unit areas with the circular arc length 30 μm, and the surface pattern of each measurement-unit area is measured with an AFM (SPM-9500J3 produced by SHIMADZU Corporation). Moreover, writing/reading check (magnetic disk check) is conducted with magnetic disk drives using magnetic disks that are produced from the glass substrates of Examples 1 and 2 and Comparative examples 1 to 3 under conditions that the flying height of the magnetic head element is set to 8 nm and the rotation speed of the magnetic disk is set to 10000 rpm.

FIGS. 7 to 11 are diagrams for explaining results that are obtained by measuring with the AFM a given unit-measurement area of the glass substrate in each of Examples 1 and 2 and Comparative examples 1 to 3. The horizontal axis indicates the position in the circumferential direction within the unit-measurement area; the vertical axis indicates the bumpy pattern in the assumption that the average height of the main surface of the glass substrate is zero. Because the bumpy pattern at periods 2 μm or more is deleted from the measurement data by the filtering processing, only the bump shape at periods less than 2 μm is shown in FIGS. 7 to 11.

Figure 7:
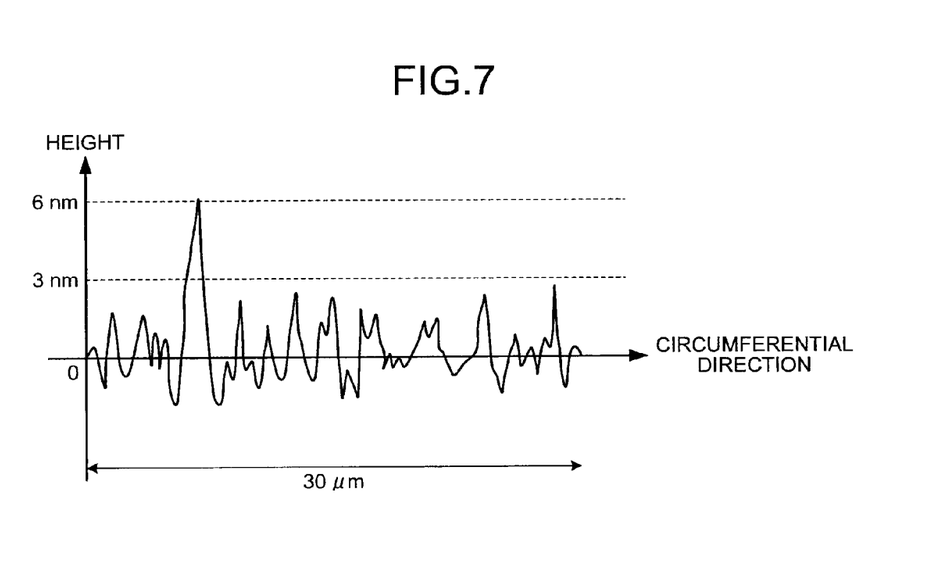
FIG. 7 is a diagrams for explaining a result that is obtained by measuring with an AFM a given unit-measurement area of a glass substrate in Example 1.
Figure 8:
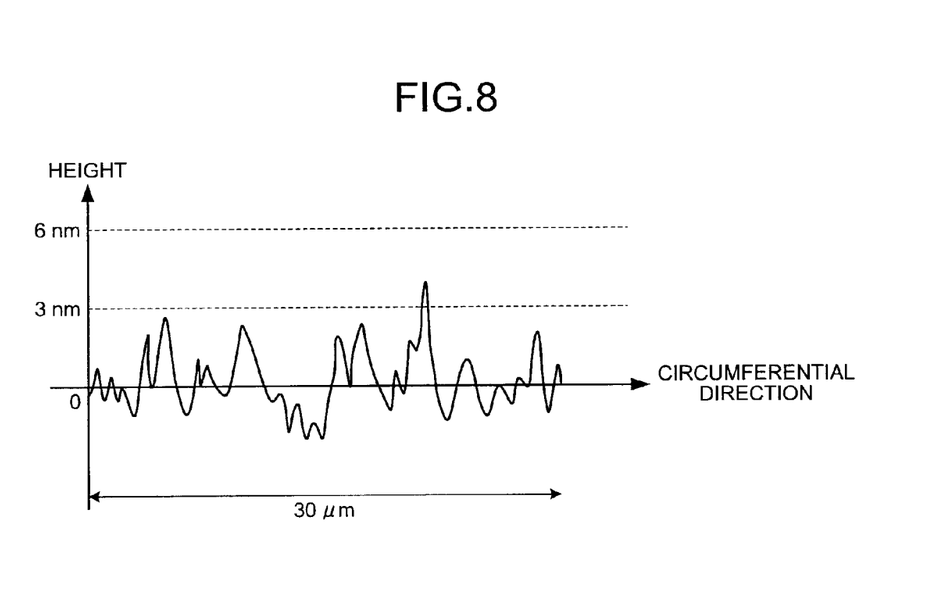
FIG. 8 is a diagrams for explaining a result that is obtained by measuring with the AFM a given unit-measurement area of a glass substrate in Example 2.
Figure 9:
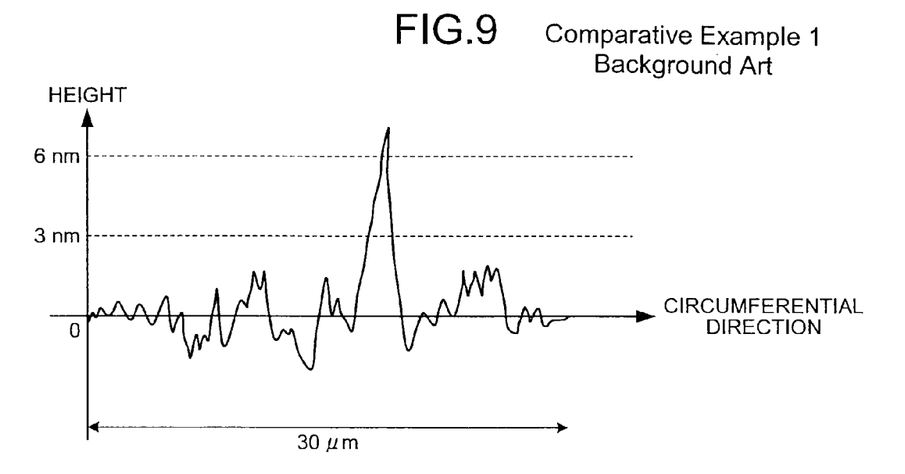
FIG. 9 is a diagrams for explaining a result that is obtained by measuring with the AFM a given unit-measurement area of a glass substrate in Comparative example 1.
Figure 10:
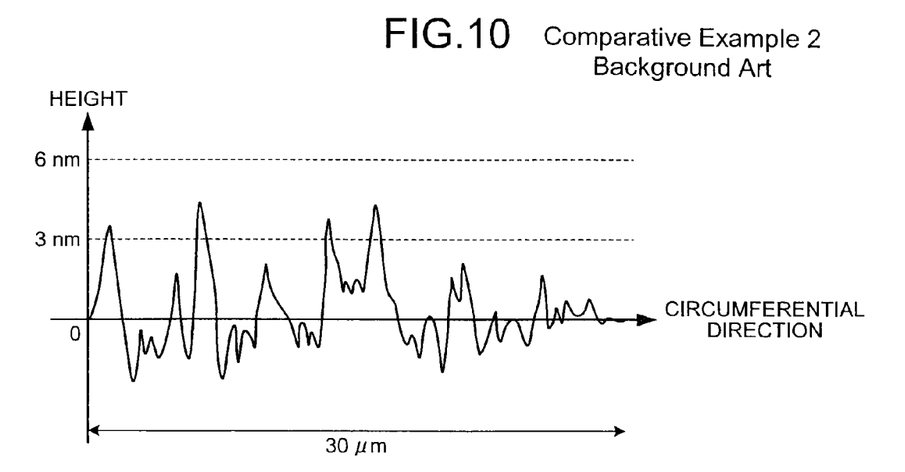
FIG. 10 is a diagrams for explaining a result that is obtained by measuring with the AFM a given unit-measurement area of a glass substrate in Comparative example 2.
Figure 11:
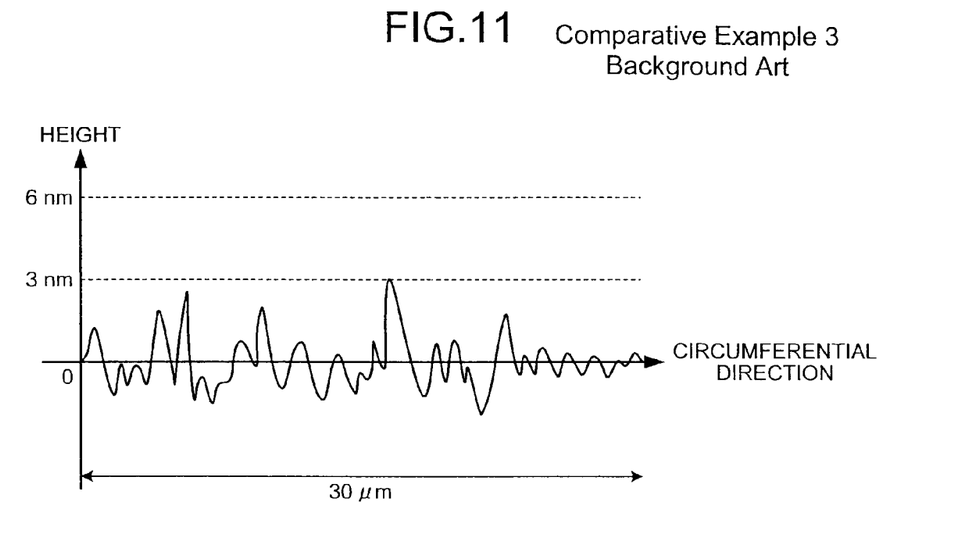
FIG. 11 is a diagrams for explaining a result that is obtained by measuring with the AFM a given unit-measurement area of a glass substrate in Comparative example 3.
Figure 12:
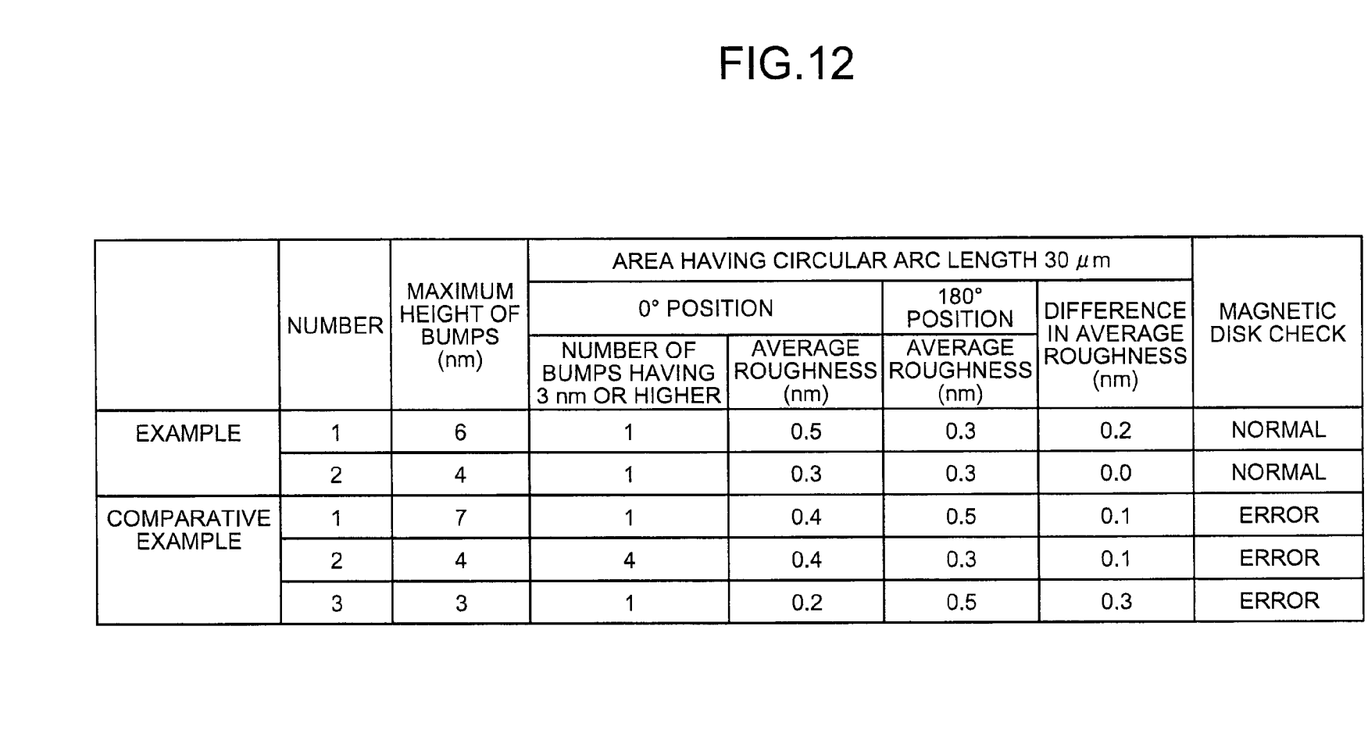
FIG. 12 is a diagram for explaining properties of the glass substrates and results of magnetic disk checks in Examples 1 and 2 and Comparative examples 1 to 3.

FIG. 12 is a diagram for explaining the properties of the glass substrates and the results of the magnetic disk checks in Examples 1 and 2 and Comparative examples 1 to 3. The properties of the glass substrate are shown in FIG. 12, such as the maximum height of all the bumps within the annular area, the number of the bumps having the height 3 nm or higher in the measurement-unit area located at a predetermined position (0° position), the average roughness, the average roughness of the measurement-unit area at a 180° position, which is positioned 180° from the 0° position, and a difference between the average roughness at the 0° position and the average roughness at the 180° position. A mark "O" in FIG. 12 indicates that no error occurs in the magnetic disk check; a mark "X" indicates that an error occurs. As shown in FIGS. 7 and 12, although the glass substrate in Example 1 has one bump having the maximum height 6 nm in the measurement-unit area and the difference in the average roughness is 0.2 nm, no error occurs in the magnetic disk check. As shown in FIGS. 8 and 12, although the glass substrate in Example 2 has one bump having the maximum height from 3 nm to 6 nm in the measurement-unit area and the difference in the average roughness is 0.0 nm, no error occurs in the magnetic disk check. In contrast, as shown in FIGS. 9 and 12, although the glass substrate in Comparative example 1 has one bump having the maximum height 7 nm in the measurement-unit area, an error occurs in the magnetic disk check. As shown in FIGS. 10 and 12, although the glass substrate in Comparative example 2 has four bumps having the maximum height from 4 nm to 5 nm in the measurement-unit area, an error occurs in the magnetic disk check. As shown in FIGS. 11 and 12, although the maximum height of the bumps in the measurement-unit area is 3 nm or lower in the glass substrate in Comparative example 3, because the difference in the average roughness is large, i.e., 0.3 nm, an error occurs in the magnetic disk check. The glass substrates in Comparative examples 1, 2, and 3 have the same polishing conditions; nevertheless, the different results of the measurement are obtained as described above.

As described above, the glass substrate for the magnetic disk according to the present invention is preferable for usage in a magnetic disk drive, such as a hard disk drive.

Further effect and modifications can be readily derived by persons skilled in the art. Therefore, a more extensive mode of the present invention is not limited by the specific details and the representative embodiment. Accordingly, various changes are possible without departing from the spirit or the scope of the general concept of the present invention defined by the attached claims and the equivalent.

What is claimed is:

1. A glass substrate for a magnetic disk, comprising:
  a hole and an annular area concentrically positioned around the hole, the annular area having a width of 30 μm on a main surface on which a magnetic recording area is formed,
  a plurality of circumferential unit areas within the annular area, the unit areas each having a same radius from the hole and a circular arc length of 30 μm, and
  bumps provided in any area within the annular area, wherein
  a difference in arithmetic average roughness values between different unit areas of the unit areas within the annular area, the different unit areas being positioned 180° from each other along a circular path of the annular area, is 0.2 nm or smaller,
  the bumps from a roughness pattern having a roughness period of smaller than 2 μm,
  the bumps have a maximum height of 6 nm, and
  a number of the bumps having a height of 3 nm or higher is one or less.

2. The glass substrate according to claim 1, wherein the number of the bumps having a height of 3 nm or more is one.

3. The glass substrate according to claim 1, wherein a magnetic disk produced from the glass substrate is operated under a condition that a rotation speed of the magnetic disk is set to 10,000 RPM or more.

4. The glass substrate according to claim 1, wherein a magnetic disk produced from the glass substrate is operated under a condition that a flying height of a magnetic head element is set to 8 nm or less.

5. The glass substrate according to claim 1, wherein a magnetic disk produced from the glass substrate is operated under a condition that an effective width of a magnetic head is 30 μM.

* * * * *